United States Patent [19]
Wagai et al.

[11] Patent Number: 5,251,319
[45] Date of Patent: Oct. 5, 1993

[54] OPTICAL TRANSMISSION APPARATUS FOR DIGITAL DEVICES

[75] Inventors: Chikao Wagai; Shigeki Yokoyama; Motoichi Kusakabe, all of Tokyo, Japan

[73] Assignee: Koden Industry Co., Ltd., Japan

[21] Appl. No.: 865,729

[22] Filed: Apr. 9, 1992

Related U.S. Application Data

[63] Continuation of Ser. No. 463,049, Jan. 11, 1990, abandoned.

[30] Foreign Application Priority Data

Apr. 17, 1989 [JP] Japan ................ 1-88739

[51] Int. Cl.⁵ .................. G06F 13/00; G06F 1/04
[52] U.S. Cl. .................... 395/275; 395/550; 364/DIG. 2; 364/240.6; 364/271.5; 364/935.54; 364/939.5; 375/106; 385/15; 385/100
[58] Field of Search .......... 364/900 MS File; 250/227.11, 227.12; 395/275, 550; 375/106; 385/15, 100

[56] References Cited

U.S. PATENT DOCUMENTS

| | | | |
|---|---|---|---|
| 3,876,833 | 4/1975 | Breant | 375/110 |
| 4,079,456 | 3/1978 | Lunsford et al. | 395/550 |
| 4,162,400 | 7/1979 | Pitts, Jr. | 250/256 |
| 4,166,946 | 9/1979 | Chown et al. | 250/199 |
| 4,259,746 | 3/1981 | Sandstedt | 455/600 |
| 4,516,221 | 5/1985 | Nakata et al. | 364/900 |
| 4,642,791 | 2/1987 | Mallozzi et al. | 364/900 |
| 4,649,512 | 3/1987 | Nukiyama | 395/325 |
| 4,813,012 | 3/1989 | Valeri et al. | 364/900 |
| 4,860,193 | 8/1989 | Bentley et al. | 395/325 |
| 4,873,431 | 10/1989 | Ito | 250/227 |
| 4,941,206 | 7/1990 | Sakurai et al. | 359/119 |
| 4,945,806 | 8/1990 | Merrill, Jr. | 84/645 |

FOREIGN PATENT DOCUMENTS 0270896 11/1987 European Pat. Off. .

Primary Examiner—Parshotam S. Lall
Assistant Examiner—Krisna Lim
Attorney, Agent, or Firm—Skjerven, Morrill, MacPherson, Franklin & Friel

[57] ABSTRACT

An optical transmission apparatus includes a transmitter having a data write signal detection circuit for detecting a data write signal to output a parallel/serial conversion timing signal, a parallel/serial conversion circuit for converting parallel input data into serial data in response to the parallel/serial conversion timing signal, and a light-emitting element for converting the serial data output from the parallel/serial conversion circuit into an optical transmission signal, an optical fiber cable for transmitting the optical transmission signal supplied from the transmitter, and a receiver having a light-receiving element for converting the optical transmission signal supplied through the optical fiber cable into serial data, a serial/parallel conversion timing generation circuit for detecting a reception end timing of the serial data output from the receiver to output a serial/parallel conversion timing signal, a serial/parallel conversion circuit for converting serial data output from the receiver into parallel data in response to a serial/parallel conversion timing signal, and a delay circuit for delaying the serial/parallel conversion timing signal by a predetermined time period to reproduce and output the data write signal.

11 Claims, 7 Drawing Sheets

OPTICAL TRANSMISSION APPARATUS FOR DIGITAL DEVICES

This application is a continuation of application Ser. No. 07/463,049, filed Jan. 11, 1990, now abandoned.

BACKGROUND OF THE INVENTION

1. Field of the Invention

The present invention relates to a transmission apparatus which is connected between various data processing equipment such as a personal computer, an office computer, a word processor, and a printer to transmit data and, more particularly, to an optical transmission apparatus for optically transmitting data between the equipment.

2. Description of the Related Art

A so-called multi-core cable or a flat cable has been conventionally used as a cable which connects a computer and a printer. Since these cables include a bundle of wires, electromagnetic waves generated from the wire cables are picked up and amplified by surrounding radio and electronic equipment as noise, thus adversely affecting this equipment. Therefore, an optical transmission apparatus for connecting an optical fiber cable between data equipment, and for transmitting data as serial data has been proposed (Published Unexamined Japanese Patent Application No. 60-141051).

In a conventional optical transmission apparatus, optical transmission/reception modules each having the same number of pins and the same pin arrangement as those in a receptacle are respectively arranged on a printed circuit board incorporated in a CPU of a personal computer and a printed circuit board incorporated in a printer to allow replacement with a conventional receptacle. These optical transmission/reception modules are optically coupled to each other through an optical fiber cable having a two-core structure. Each optical transmission/reception module is connected to the optical fiber cable through an optical connector.

In each optical transmission/reception module, input data to be transmitted, a data write signal (WD signal), and a control signal are input to an input buffer as parallel input signals. Thereafter, these signals are held by a data hold circuit. The data hold circuit holds the parallel input signals during a sampling period T during which a next stage parallel/serial conversion circuit samples data, and assures that the parallel input signal is reliably sampled at a sampling timing Sm. The parallel/serial conversion circuit converts the parallel input signal into a serial signal, and the converted serial signal is properly modulated by a transmission circuit. The modulated signal is converted into an optical signal by a light-emitting diode and the optical signal is transmitted.

The transmitted optical signal is transmitted through an optical fiber cable, and is converted into an electrical signal by a photodiode. This electrical signal is properly demodulated by a receiving circuit. Thereafter, the demodulated signal is converted into a parallel signal by the parallel/serial conversion circuit, and the converted signal is output through an output buffer.

Parallel data output from the CPU includes a data write signal (WD signal) for controlling write timing of the data. This WD signal is converted into serial data together with the parallel data, and the converted serial data is transmitted. Normally, this WD signal is a pulse having a small width which is generated during an output period of the parallel data, and is entirely included in the parallel data. All the pulse widths of the parallel outputs from the serial/parallel conversion circuit are equal to each other. For this reason, this conventional apparatus includes a first delay circuit for delaying the leading edge of the WD signal included in output signals from the output buffer by $\tau 1$, and a second delay circuit for delaying the trailing edge of the output data by $\tau 2$. The WD signal is perfectly included in the output data by these two delay circuits.

In the above-mentioned conventional optical transmission apparatus, a sampling time of a parallel input signal is fixed on the optical transmission apparatus side. Therefore, an input period of the parallel input signal cannot be shorter than the sampling period. This is an obstacle which occurs when the above optical transmission apparatus is applied to various equipment having different data processing or transmission speeds.

The data hold circuit holds the parallel input data during a sampling period T from the trailing edge of the data This period is set to achieve reliable sampling of, e.g., a WD signal having a relatively small pulse width. Single input data having a large pulse width is, however, sampled more than two times, i.e., multiple-sampled. For this reason, a countermeasure against this multiple sampling has been required.

SUMMARY OF THE INVENTION

It is an object of the present invention to provide an optical transmission apparatus which can be applied to various equipment having different transmission speeds, and which can prevent multiple sampling of the data.

According to the present invention, there is provided an optical transmission apparatus comprising a transmitter including a data write signal detection circuit for detecting a data write signal to output a parallel/serial conversion timing signal, a parallel/serial conversion circuit for receiving parallel input data to convert the data into serial data in response to the parallel/serial conversion timing signal, and a light-emitting element for generating an optical transmission signal corresponding to the serial data output from the parallel/serial conversion circuit, a receiver including an optical fiber cable for transmitting the optical transmission signal supplied from the transmitter, and a light-receiving element for receiving the optical transmission signal supplied through the optical fiber cable to obtain the serial data, a serial/parallel conversion timing generation circuit for detecting a reception end timing of the serial data output from the receiver to output a serial/parallel conversion timing signal, a serial/parallel conversion circuit for converting the serial data output from the receiver into parallel data in response to the serial/parallel conversion timing signal to output the parallel data, and a delay circuit for delaying the serial/parallel conversion timing signal by a predetermined time period to reproduce and output the data write signal.

According to the teachings of the present invention, the data write signal is not transmitted, but it is produced by output data of the receiver on the reception side, so that only input data may be sampled. Therefore, the input data is sampled in synchronism with the data write signal. When such a sampling operation is performed, the data write signal is always output from the transmission equipment side in synchronism with the input data. Therefore, sampling is performed to cope with various transmission speeds. In addition, since a one-to-one correspondence is achieved between the input data and the sampling pulse (data write signal), multiple sampling for single data is not performed According to the present invention, transmission efficiency can be increased since the data write signal is not transmitted.

According to the present invention, there is provided an optical transmission apparatus for achieving high transmission efficiency which can prevent breakdown of data which occurs when a new transmission start designation signal is output from the equipment on the data transmission side during data transmission processing, and can be applied to various equipments having different transmission speeds. More specifically, the optical transmission apparatus of this invention includes a transmission in-process signal generation circuit for detecting a data transmission start designation signal serving as a conversion start trigger given when parallel data input from the equipment located on the data transmission side is converted into serial data by the parallel/serial conversion circuit on the data transmission side, and for supplying a transmission in-process signal, representing that data transmission processing is being performed, to the equipment on the transmission side during at least a period required until the data input from the equipment on the data transmission side is transmitted to the equipment on the data reception side.

According to the present invention, the transmission in-process signal is supplied to the equipment on the data transmission side for outputting data to be transmitted. While the transmission in-process signal is supplied, the equipment on the data transmission side does not output a new data transmission start designation signal. Therefore, data which is being transmitted is not broken.

With the above arrangement, a generation interval of a WD signal in the equipment on the transmission side will not be unnecessarily increased. Therefore, transmission efficiency can be improved.

Additional objects and advantages of the invention will be set forth in the description which follows. The objects and advantages of the invention may be realized and obtained by means of the instrumentalities and combinations particularly pointed out below and in the appended claims.

DESCRIPTION OF THE PREFERRED EMBODIMENTS

Figure 1:
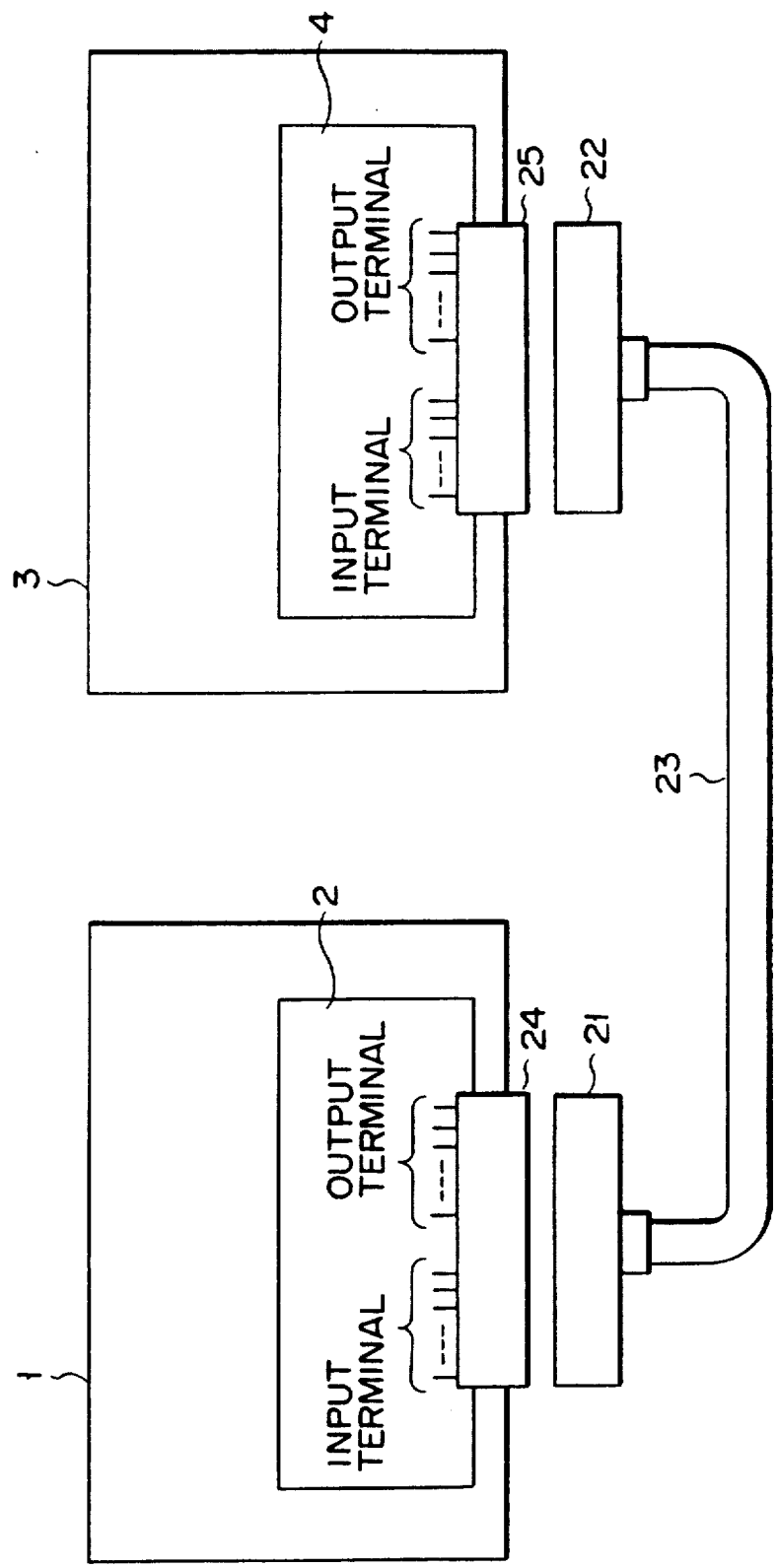
FIG. 1 is a block diagram showing a schematic arrangement of a system to which an optical transmission apparatus according to an embodiment of the present invention is applied.

In an optical transmission apparatus shown in FIG. 1, plugs 21 and 22, which respectively incorporate optical transmission/reception modules, are connected to each other through an optical fiber cable 23 having a two-core structure. The optical transmission/reception module 21 is detachably connected to a conventional receptacle 24 mounted on a printed circuit board 2 of, e.g., a personal computer 1, and the optical transmission/reception module 22 is detachably connected to a normal receptacle 25 mounted on a printed circuit board 4 of, e.g., a printer 3.

The optical transmission/reception modules 21 and 22 will be described hereinafter with reference to FIG. 2.

Each module includes a transmitter having an input buffer 31, a parallel/serial conversion section 32 connected to output terminals of the input buffer 31, a transmission circuit 33 connected to an output terminal of the parallel/serial conversion section 32, and a light-emitting diode 34 connected to an output terminal of the transmission circuit 33, and a receiver having a photodiode 35, a receiving circuit 36 connected to an output terminal of the photodiode 35, a serial/parallel conversion section 37 connected to an output terminal of the receiving circuit 36, and an output buffer 38 connected to output terminals of the serial/parallel conversion section 37.

The parallel/serial conversion section 32 includes a parallel/serial conversion circuit 41, a WD signal detection circuit 42 connected to the parallel/serial conversion circuit 41, and a transmission clock generation circuit 43. For example, 16-bit parallel input data output from the personal computer 1 is input to the parallel/serial conversion circuit 41 through the input buffer 31. A data write signal (WD signal) input to the parallel/serial conversion section 32 in synchronism with the input data is detected by the WD signal detection circuit 42. When the WD signal detection circuit 42 detects a WD signal, the circuit 42 outputs a parallel/serial conversion timing signal PS to the parallel/serial conversion circuit 41. The parallel/serial conversion circuit 41 includes a shift register (not shown). When the circuit 41 receives the parallel/serial conversion signal PS, the circuit 41 converts the input data into serial data in synchronism with a transmission clock CK from the transmission clock generation circuit 43, and outputs the converted serial data. The transmission circuit 33 converts the serial signal output from the parallel/serial conversion circuit 41 into a modulation signal, if necessary, thus driving the light-emitting diode 34. The light-emitting diode 34 emits an optical signal corresponding to the serial signal to another optical transmission/reception module through the optical fiber cable 23.

The optical signal supplied through the optical fiber cable 23 is converted into an electrical signal by the photodiode 35, and is properly demodulated by the receiving circuit 36. Thereafter, the demodulated signal is input to a serial/parallel conversion circuit 44 as a serial signal. The serial signal is also supplied to a serial signal detection circuit 45. The serial signal detection circuit 45 detects start of input of the serial signal, and triggers a serial/parallel conversion timing generation circuit 46. The serial/parallel conversion timing generation circuit 46 counts shift clock pulses of the serial signal by a bit count of the data in response to the trigger, thus generating a data reception end signal DE. The serial/parallel conversion circuit 44 includes a shift register (not shown). The circuit 44 sequentially holds input serial data, and outputs the held serial data as parallel output data when the data reception end signal DE is input. The output data is output to the printer 3 through the output buffer 38.

When a delay circuit 47 receives the data reception end signal DE, the circuit 47 delays the signal DE by a predetermined time period τ 1, thus outputting the delayed signal as a WD signal.

Figure 3:
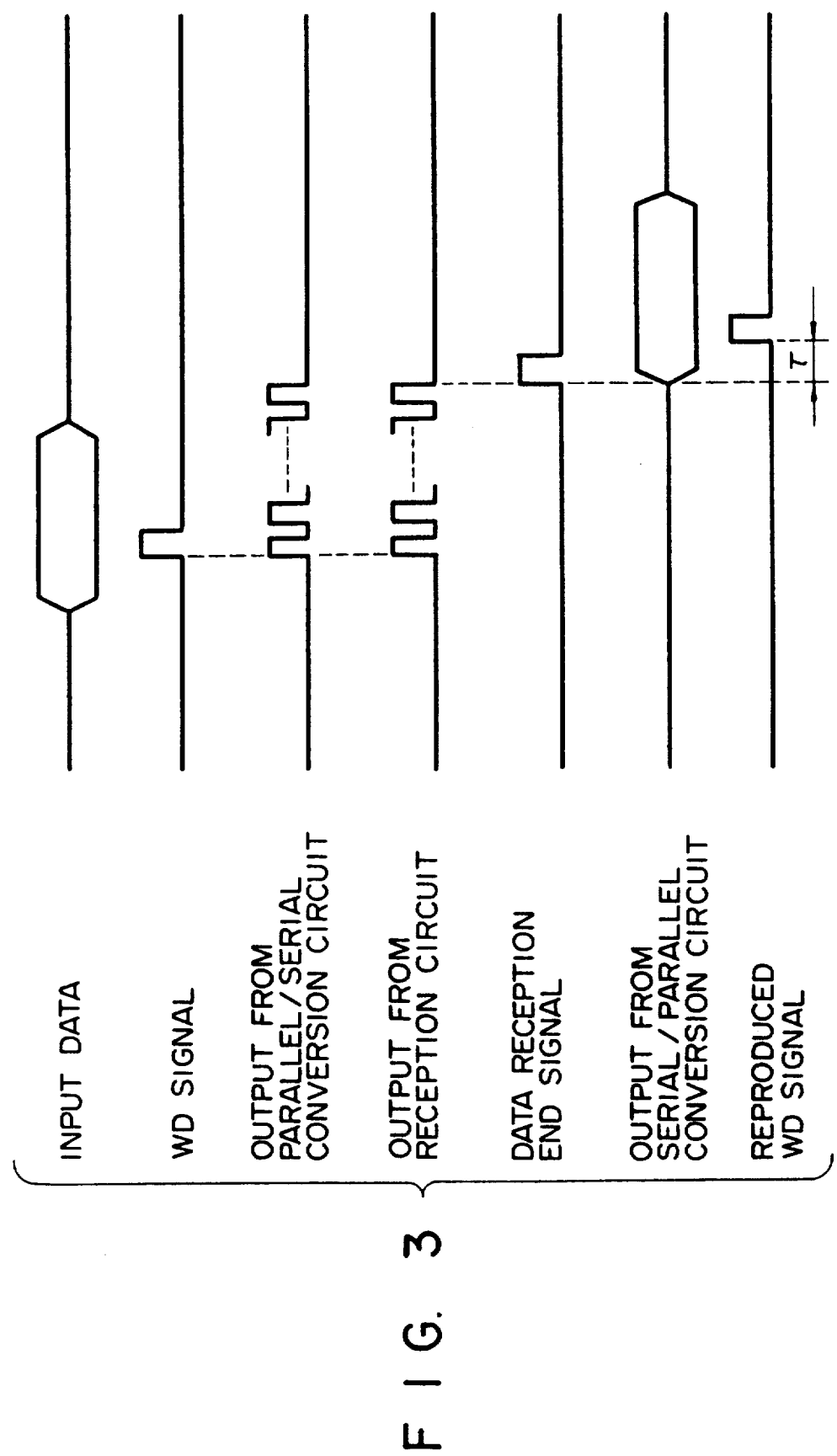
FIG. 3 is a timing chart for explaining an operation of the apparatus shown in FIG. 1.

As shown in the timing chart in FIG. 3, the WD signal is supplied from external equipment such as the personal computer 1 in synchronism with the input data. Therefore, if the WD signal is detected by the WD signal detection circuit 42, write timing of the input data can be accurately set.

Since the WD signal is reproduced by delaying the data reception signal DE generated upon reception of the end of the serial signal by τ 1, the WD signal itself need not be transmitted.

Thus, according to the teachings of the present invention even if an output timing of the input data is varied, adequate sampling can be performed, and multiple sampling of the input data can be prevented.

According to this embodiment, since a circuit for adjusting complicated sampling timing is not required, the arrangement itself can be simplified, and the optical transmission/reception module can be incorporated in the plug, as described above. For this reason, a conventional receptacle may be arranged to the external equipment in the same manner as in a case wherein conventional wires are used. This apparatus can therefore be applied to conventional equipment without modification.

Another embodiment will be described hereinafter with reference to FIG. 4.

Figure 2:
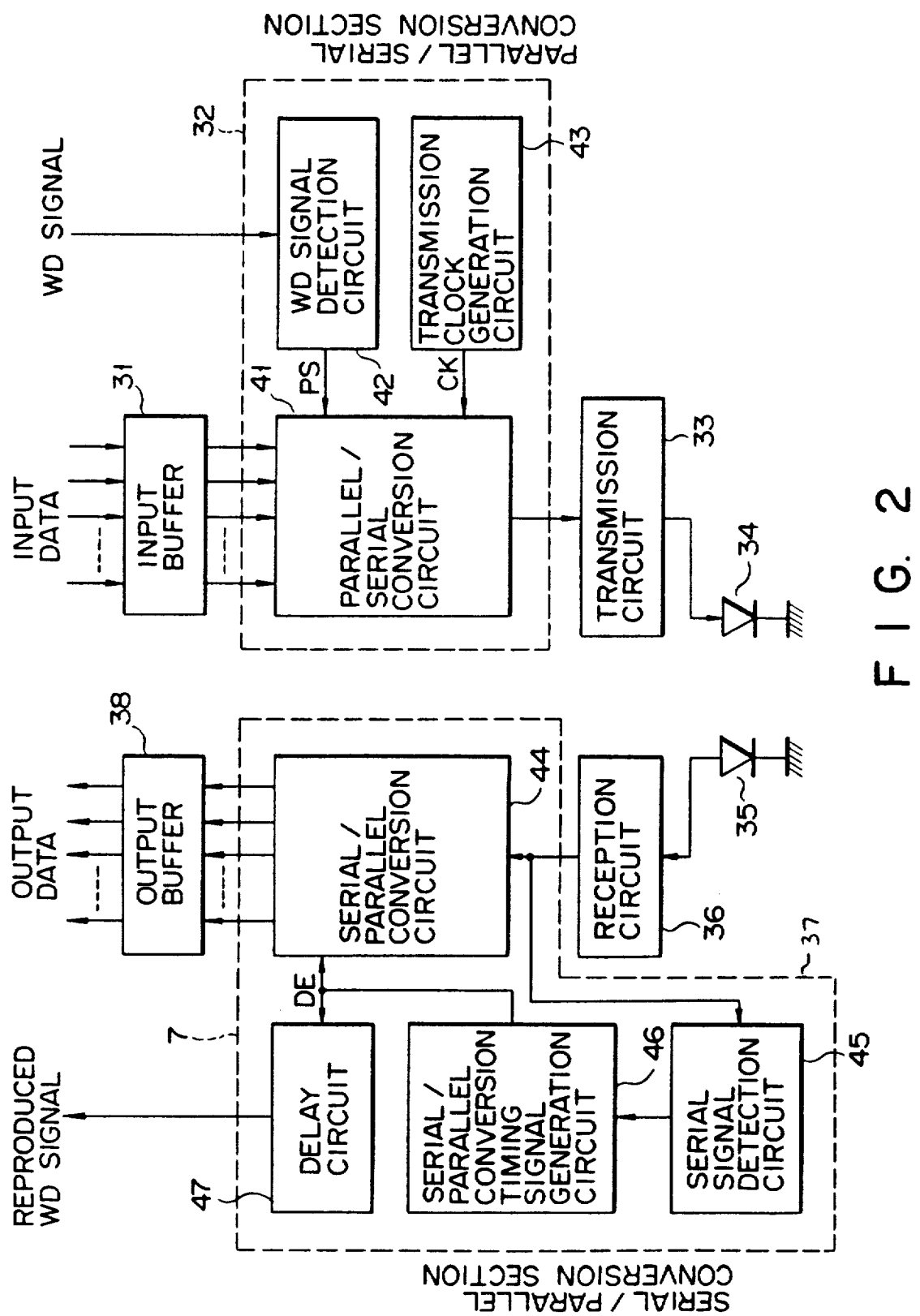
FIG. 2 is a block diagram showing optical transmission reception modules in the optical transmission apparatus shown in FIG. 1.
Figure 4:
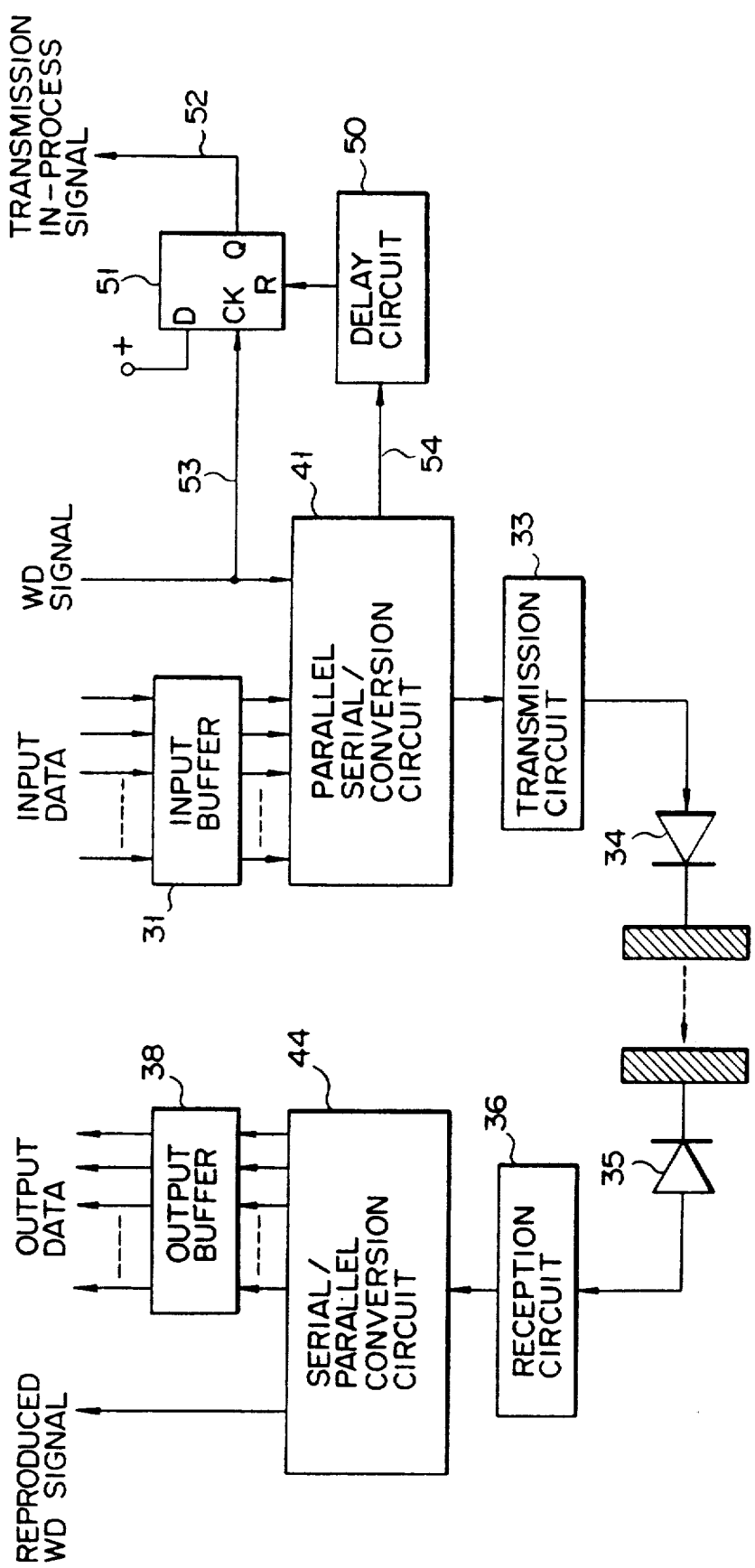
FIG. 4 is a block diagram showing an optical transmission apparatus according to another embodiment of the present invention.

In the optical transmission apparatus shown in FIG. 4, an input buffer 31, a parallel/serial conversion circuit 41, a transmission circuit 33, a light-emitting diode 34, a photodiode 35, a receiving circuit 36, a serial/parallel conversion circuit and an output buffer 38 are the same as those in the arrangement of the embodiment shown in FIG. 2. In FIG. 4, a delay circuit 50 and a D-type flip-flop 51 serving as a transmission in-process signal generation circuit are additionally arranged.

An operation of the apparatus in FIG. 4 will be described hereinafter with reference to a timing chart in FIG. 5.

Data to be transmitted (input data) and a WD signal (data write signal) serving as a data transmission start designation signal are output from equipment (not shown) on the data transmission side.

The input data signal is input to the parallel/serial conversion circuit 41 through the input buffer 31, and is converted into serial data. The WD signal is input to the parallel/serial conversion circuit 41. At the same time, the WD signal is also input to a clock terminal CK of the flip-flop 51 through a wire 53. A data input terminal D of the flip-flop 51 has a predetermined positive (+) level. As shown in FIG. 5, therefore, an output from a Q terminal of the flip-flop 51 goes to high level at a leading edge of the WD signal and serves as a transmission in-process signal. The transmission in process signal is supplied to an external equipment such as a personal computer (not shown) on the data transmission side through a wire 52. When the personal computer receives the transmission in-process signal, the computer recognizes "in-process", and prevents further data transmission until the transmission in-process signal is cleared.

Figure 5:
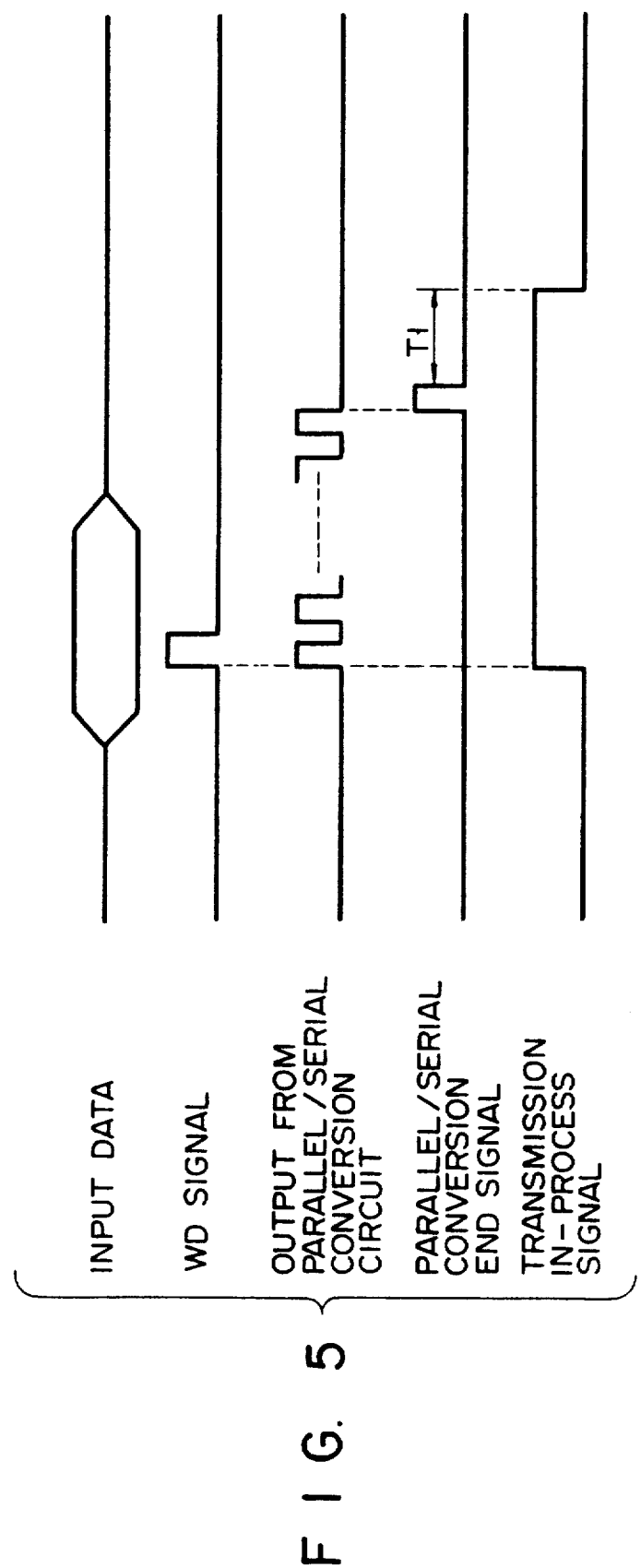
FIG. 5 is a timing chart for explaining an operation of the apparatus shown in FIG. 4.

When a conversion period of time at the parallel/serial conversion circuit 41 has elapsed after the WD signal is input to the parallel/serial conversion circuit 41, i.e., when one parallel/serial conversion cycle of the input data is ended, a parallel/serial conversion end signal shown in FIG. 5 is output from the parallel/serial conversion circuit 41, and is input to the delay circuit 50 through a wire 54. The delay circuit 50 delays the input parallel/serial conversion end signal by a time period T1 shown in FIG. 5. An output signal from the delay circuit 50 is input to a reset terminal R of the flip-flop 51. Therefore, the transmission in-process signal shown in FIG. 5 goes to low level after the time period T1 has elapsed from the trailing edge of the parallel/serial conversion end signal shown in FIG. 5, i.e., output of the transmission in-process signal is stopped. The personal computer then releases a transmission waiting mode, and transmits new data to the transmission/reception module.

The delay time period T1 of the delay circuit 50 is selected to be equal to or slightly longer than a sum (ta + tb + tc) where time period (ta) is the time of conversion from an electrical signal to an optical signal in the transmitter including the transmission circuit 33 and the light-emitting diode 34, time period (tb) is the time of conversion from an optical signal to an electrical signal in the receiver including the photo diode 35 and the receiving circuit 36, and time period (tc) is the time of conversion by the serial/parallel conversion circuit 44. Therefore, the transmission in-process signal is set at high level during the time period corresponding to the above-mentioned sum, i.e., a period required to transmit input data from the equipment (personal computer) on the data transmission side to the equipment (printer) on the data reception side after the WD signal serving as a data transmission start designation signal is input.

The transmitting equipment on the data transmission side does not output a new WD signal while the transmission in-process signal is set at high level. Therefore, breakdown of transmitting data which occurs by inputting a new WD signal to the parallel/serial conversion circuit 41 during transmission processing can be prevented.

Figure 6:
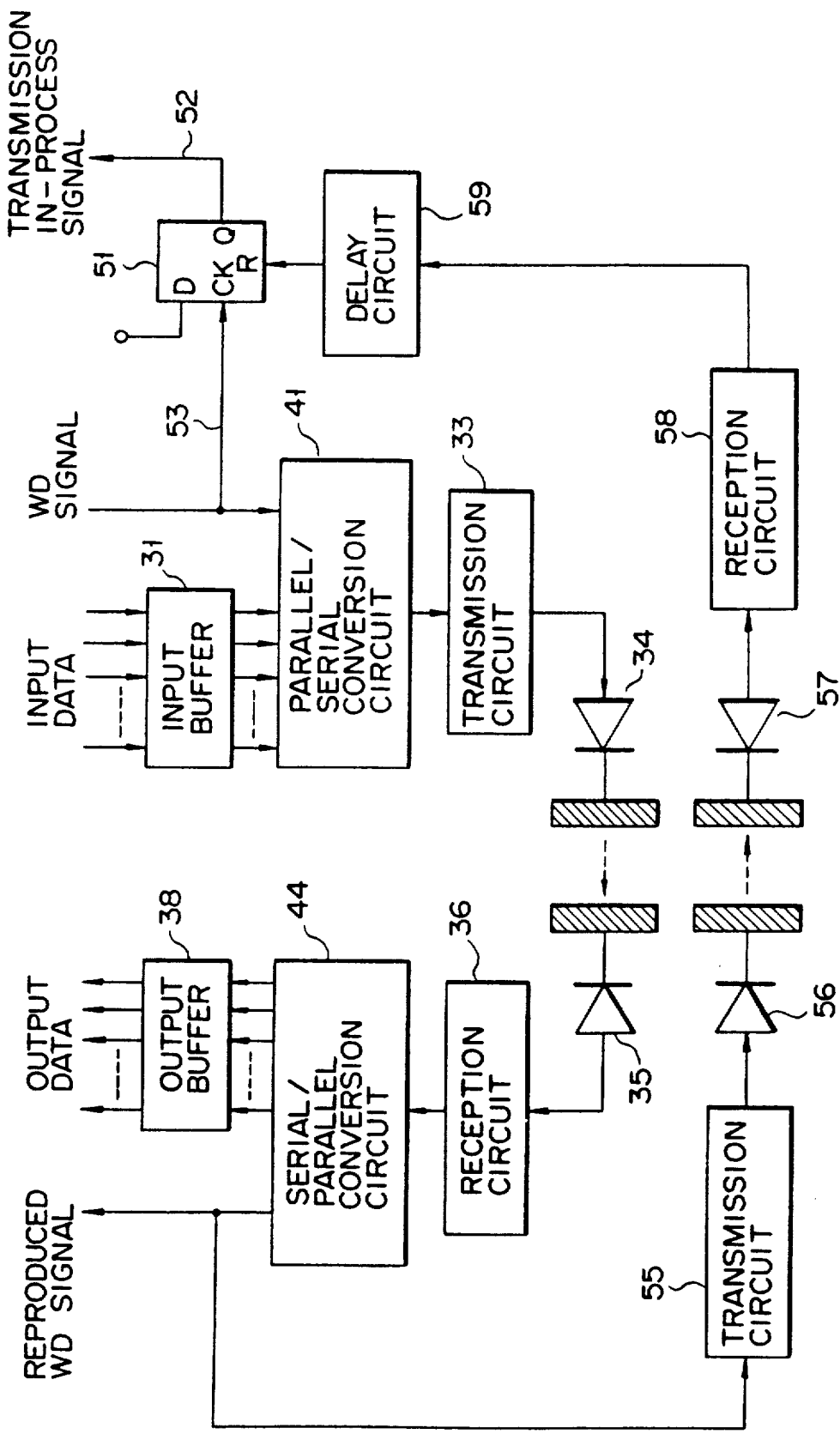
FIG. 6 is a block diagram showing an optical transmission apparatus according to an alternative embodiment of the present invention.

An apparatus and its operation according to still another embodiment of the present invention will be described hereinafter with reference to FIGS. 6 and 7.

In this embodiment, a signal obtained by delaying a reproduced WD signal is used as a reset signal for a flip-flop 51, unlike in the embodiment in FIG. 4. A WD signal shown in FIG. 7 output from an equipment on the data transmission side together with input data shown in FIG. 7 is supplied to a parallel/serial conversion circuit 41, and is also input to a clock terminal CK of the flip-flop 51 through a wire 53.

Figure 7:
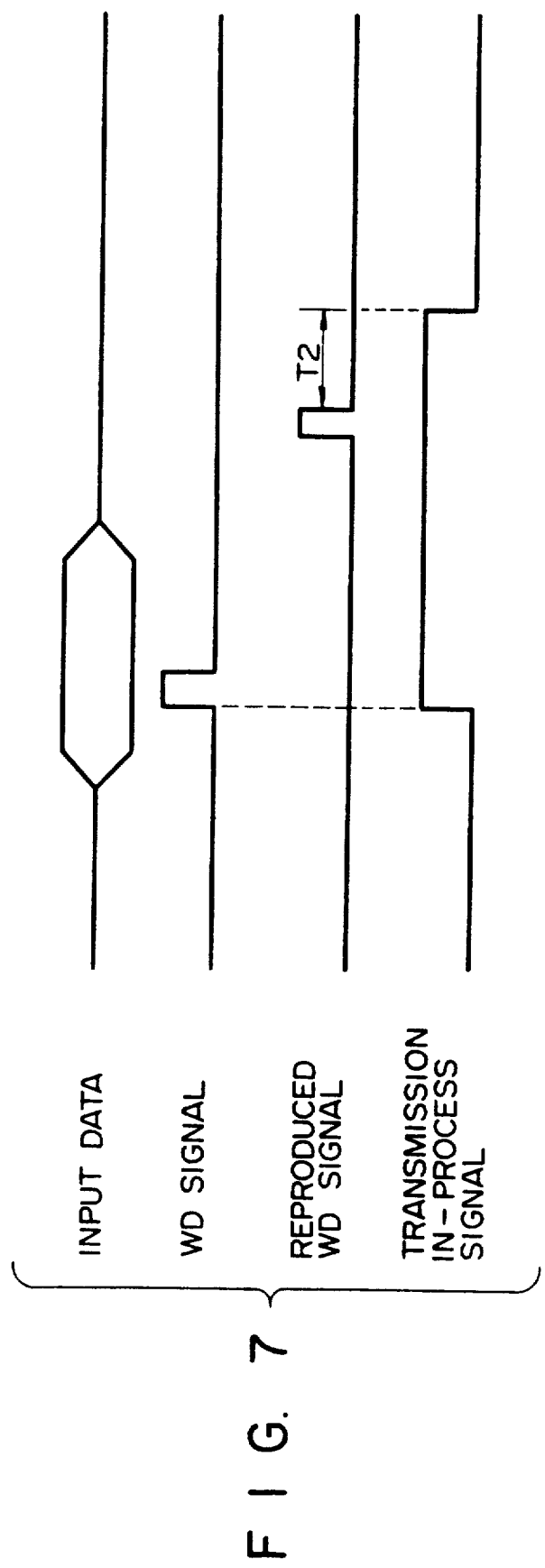
FIG. 7 is a timing chart for explaining an operation of the apparatus shown in FIG. 6.

On the data reception side, a reproduced WD signal in FIG. 7 output from a serial/parallel conversion circuit 44 is supplied to equipment (not shown) on the data reception side, and is also supplied to a transmission circuit 55 which is additionally arranged on the data reception side. This signal is converted into a modulation signal, as needed. An output signal from the transmission circuit 55 is converted into an optical signal by a light-emitting diode 56, and the converted signal is transmitted to the data transmission side through an optical fiber cable 3 shown in FIG. 8.

The optical signal corresponding to the reproduced WD signal thus supplied to the data transmission side through the optical fiber cable is converted into an electrical signal by the photodiode 57, and the converted signal is properly demodulated by a receiving circuit 58. Thereafter, the demodulated signal is supplied to a delay circuit 59. The WD signal input to the delay circuit 59 is delayed by a predetermined time period T2 shown in FIG. 7, and the signal is input to a reset terminal R of the flip-delayed flop 51 serving as a transmission in-process signal generation circuit. For example, this delay time period T2 is set to be substantially equal to or slightly longer than a time period required until the serial/parallel converting operation is ended after the serial/parallel conversion circuit 44 outputs the WD signal.

As shown in FIG. 7, therefore, a transmission in-process signal output from the flip-flop 51 is set at high level during a period until data output from the serial/parallel conversion circuit 44 on the data reception side is ended after the WD signal is input to the parallel/serial conversion circuit 41 on the data transmission side. This transmission in-process signal is supplied to the equipment on the data transmission side through a wire 52. The equipment on the data transmission side does not output a new WD signal during a period of the high-level transmission in-process signal. Therefore, breakdown of transmitting data which occurs when a new WD signal is input to the parallel/serial conversion circuit 41 during transmission processing can be prevented in the same manner as in the embodiment shown in FIG. 4.

As described above, according to the present invention, data can be transmitted without being limited by a transmission timing of input data, and highly reliable sampling can be performed.

According to the present invention, transmission efficiency is improved since a data write signal is not transmitted, and various advantageous effects, e.g., a short delay time until parallel/serial conversion of input data is started, can be achieved.

According to the present invention, when a transmission in-process signal representing "in-process" is supplied to an equipment on the data transmission side during transmission processing of data from the equipment on the data transmission side to an equipment on the data reception side, output of the transmission start designation signal from the equipment on the data transmission side can be prevented Therefore, data which is being transmitted is not broken by attempts of the transmitter side circuitry to begin processing new data before finishing processing of the old data.

In addition, according to the present invention, since the transmission start designation signal from the equipment on the data transmission side is detected to output the transmission in-process signal, a generation interval of the transmission start designation signal from the equipment on the data transmission side need not be unnecessarily increased. Thus, the optical transmission apparatus according to the present invention is compatible with various equipment having different transmission speeds, and transmission efficiency can be improved.

Additional advantages and modifications will readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

What is claimed is:

1. An optical transmission apparatus comprising:
   (1) a transmitter including data write signal detecting means for detecting a data write signal and outputting a parallel/serial conversion timing signal, parallel/serial converting means for receiving parallel input data sent from an external device and for converting the parallel input data into serial data in response to said parallel/serial conversion timing signal, and light-emitting means for converting the serial data output from said parallel/serial converting means into an optical transmission signal;
   (2) optical transmission path means for transmitting the optical transmission signal supplied from said transmitter;
   (3) a receiver including light-receiving means for converting the optical transmission signal supplied through said optical transmission path means into serial data;
   (4) serial/parallel conversion timing generating means for detecting the end of serial data output from said receiver and for outputting a data end timing signal;
   (5) serial/parallel converting means for converting the serial data output from said receiver into parallel data in response to said data end timing signal; and
   (6) delay circuit means for delaying by a predetermined interval data end timing signal synchronously with said parallel data on the receiver, thereby eliminating and reducing multiple data sampling and transmission among various equipments having different transmission speeds and for outputting said delayed data end signal as said data write signal.

2. An apparatus according to claim 1, wherein said transmitter includes clock generating means for generating a clock signal, and wherein said parallel/serial converting means includes a shift register means coupled to said clock generating means for converting said parallel input data into said serial data in synchronism with said clock signal and in response to the parallel/serial conversion timing signal.

3. An apparatus according to claim 1, wherein the serial data includes a predetermined number of data bits, and said serial/parallel conversion timing generating means includes means for counting the data bits of the serial data and for outputting said data end timing signal when said counted value equals said predetermined number of data bits.

4. An apparatus according to claim 1, wherein said optical transmission path means is an optical fiber cable.

5. The apparatus according to claim 1 further comprises first housing means incorporating said transmitter, and second housing means incorporating said receiver, said serial/parallel conversion timing generating means, said serial/parallel converting means, and said delay circuit means.

6. An optical transmission apparatus used in association with data transmission equipment for generating a data transmission start designation signal and data reception equipment, said optical transmission apparatus comprising:
   (1) parallel/serial converting means for converting input data including parallel data from said data transmission equipment into serial data in response to the data transmission start designation signal;

(2) transmitting means for generating an optical signal corresponding to the serial data output from said parallel/serial converting means;

(3) optical transmission path means for transmitting the optical signal generated from said transmitting means;

(4) receiving means for converting the optical signal supplied through said optical transmission path means into an electrical signal, to output the electrical signal as serial data;

(5) serial/parallel converting means for converting the serial data output from said receiving means into parallel data in response to detection of reception of the end of serial data transmitted from said transmitting means, and for outputting said parallel data to said data reception equipment; and (6) transmission in-process signal generating means coupled to said parallel/serial converting means for detecting said data transmission start designation signal and for generating a transmission in-process signal which is active during a conversion/transmission interval, and for supplying said transmission in-process signal to said data transmission equipment to prevent said data transmission equipment from sending more data to said parallel/serial converting means before processing of previous data is finished, thereby eliminating and reducing multiple data sampling and transmission among various equipments having different transmission speeds, said transmission in-process signal indicating that data transmission processing is being performed during said conversion/transmission interval, said conversion/transmission interval comprising the time during which said parallel/serial conversion means is converting parallel data to serial data plus the interval during which said serial data is being transmitted from said data transmission equipment to said data reception equipment.

7. An apparatus according to claim 6, wherein said receiving means includes a photodiode for converting the optical signal into an electrical signal.

8. An apparatus according to claim 6, wherein said transmission in-process signal generating means includes a flip-flop for generating the transmission in-process signal in response to the data transmission start designation signal, and stopping the transmission in-process signal a predetermined time after the end of conversion processing performed by said parallel/serial converting means.

9. An apparatus according to claim 6, wherein said transmission in-process signal generating means includes a flip-flop for generating the transmission in-process signal in response to the data transmission start designation signal, and stopping the transmission in-process signal a predetermined time after the end of conversion processing performed by said serial/parallel converting means.

10. An apparatus according to claim 6, wherein said transmitting means includes a light-emitting diode for converting the serial data into an optical signal.

11. The apparatus according to claim 6 further comprises first housing means incorporating said parallel/serial converting means and said transmitting means, and second housing means incorporating said receiving means, said serial/parallel converting means, and said transmission in-process signal generating means.

* * * * *